United States Patent [19]

Naito

[11] Patent Number: 4,486,795

[45] Date of Patent: Dec. 4, 1984

[54] DISC DRIVE SERVO SYSTEM

[75] Inventor: Ryuichi Naito, Tokorozawa, Japan

[73] Assignee: Pioneer Electronic Corporation, Tokyo, Japan

[21] Appl. No.: 451,830

[22] Filed: Dec. 21, 1982

[30] Foreign Application Priority Data

Dec. 23, 1981 [JP] Japan .................................. 56-208894
Dec. 23, 1981 [JP] Japan .................................. 56-208895

[51] Int. Cl.³ .............................................. G11B 21/10
[52] U.S. Cl. ...................................... 360/77; 358/342
[58] Field of Search .............. 360/73, 722, 86, 97–99, 360/47, 48, 77; 358/342; 356/321, 322, 338, 339

[56] References Cited

U.S. PATENT DOCUMENTS

| | | | |
|---|---|---|---|
| 3,524,164 | 8/1970 | Cox et al. | 371/55 |
| 3,911,484 | 10/1975 | Mutou et al. | 358/322 |
| 4,308,557 | 12/81 | DieTerich | 358/342 |
| 4,338,640 | 6/82 | Yabu et al. | 360/73 |

Primary Examiner—Aristotelis M. Psitos
Assistant Examiner—Kim Wong
Attorney, Agent, or Firm—Schwartz, Jeffery, Schwaab, Mack, Blumenthal & Koch

[57] ABSTRACT

A disc drive servo system for controlling the drive of a disc carrying a binary digital signal wherein the digital signal includes (i) an information signal portion in which the position of an inversion of the digital signal is determined in accordance with an analog information signal and (ii) synchronizing signal portions which include two successive maximum periods of the inversion. The system comprises a timer means for initialing a timing operation upon receipt of an inversion signal and for producing an output signal when no inversion occurs during a time period which is twice as long as the maximum period of the inversion, thereby reproducing a synchronizing signal and ensuring precise control of the disc drive speed even during periods in which the production of a clock signal is not possible.

14 Claims, 7 Drawing Figures

DISC DRIVE SERVO SYSTEM

BACKGROUND OF THE INVENTION

The present invention relates to a disc drive servo system, and particularly to a servo system for controlling the driving of a disc on which a digital signal is recorded.

Description of the Prior Art

In recent years, research has been undertaken in the field of digital recording techniques in which an analog signal such as an audio signal is recorded on a recording medium in the form of a binary digital signal (hereinafter digital signal). Specifically, the digital signal is produced by pulse code modulation (PCM) and recorded on a recording medium such as a disc or a tape. Upon playback, the digital signal on the recording medium is converted to an analog playback signal by means of a digital-to-analog (DA) converter.

Generally, the digital signal produced by pulse code modulation is further modulated by a digital modulation process to form a recording signal. This further modulation is for the purpose of raising the density of recording and for improving the frequency characteristics and reducing the error probability. Nonreturn to Zero Inverse (NRZI), Zero Modulation (ZM), Three Position Modulation (3PM) and Eight to Fourteen Modulation (EFM) are examples of known digital modulation processes which are useful in this regard. Further, self-clocking modulations which can simplify the read-out operation may preferably be utilized.

The thus modulated recording digital signal is recorded in the form of successive frames, each of which includes control signals such as a frame synchronizing signal, an address signal, and/or an error correcting signal.

In the case of EFM, each eight bits of the data train which is to be recorded is preferably converted to a fourteen bit data train in accordance with a predetermined conversion table (such as a look up table embedded in a ROM). Then, three adjustment bits are added to this fourteen bit data to form a seventeen bit data unit.

The clock signal is preferably generated from a modulation signal reproduced from the disc by the sequential steps of (a) differentiation of the reproduction signal, (b) full-wave rectification of the differentiated signal, and (c) pick up of the clock signal from the rectified signal, preferable by means of a phase locked loop (PLL) circuit.

The frame synchronizing signal is detected by comparing a logic pattern of 1's and 0's obtained from the reproduction signal (in accordance with the clock signal) with a predetermined reference logic pattern.

In prior art disc drive servo systems, a problem existed in that it was sometimes difficult or impossible to detect the clock signal due to so called spurious signals in the input signal of the PLL circuits. As will be understood by the artisan, the spurious signals have energy peaks, occurring, in the present example, at a frequency corresponding to a multiple of one seventeenth the frequency of the clock signal. Moreover, the detection of the frame synchronizing signal is not possible when the clock signal is not properly detected.

SUMMARY OF THE INVENTION

An object of the present invention is therefore to eliminate the drawbacks of the prior art disc drive servo system and to provide a system which will maintain the speed of the rotation of the disc at substantially a proper speed, even if the clock signal is not present so as to facilitate the subsequent pickup of the clock signal, and further to provide a system which is able to detect the frame synchronizing signal even during periods when the clock signal is not present.

To this end, the present invention comtemplates a disc drive servo system for controlling the drive of a disc carrying a digital signal which includes (a) information signal portions in which the position of the inversion of the binary signal is determined in accordance with an analog information signal, and (b) synchronizing signal portions which include successive maximum periods (preferably two) of inversion. The system comprises a pickup means for reproducing the digital signal from the disc, a timer means responsive to an output signal of the pickup means, the timer means being operable to initiate a timing operation from its initial state upon receipt of an inversion of the binary digital signal and to produce an output signal in the event that no inversion occurs during a certain period, for example, in the preferred embodiment, twice as long as the maximum period of the inversion. In addition, the system may comprise a comparison and control means responsive to the output signal of the timer means for producing a disc drive control signal by comparing the output signal of the timer means with a predetermined reference signal, and a disc drive means for driving the disc in accordance with the disc drive control signal.

According to another aspect of the invention, a synchronizing signal detector is provided for detecting a synchronizing signal from a digital signal which includes (a) information signal portions in which the position of the inversion of the binary signal is determined in accordance with an analog information signal, and (b) synchronizing signal portions, which preferably include two successive maximum periods of the inversion. The system comprises a timer means responsive to the digital signal for producing a timer output signal, the timer means being adapted to initiate a timing operation from its initial state upon receipt of an inversion of the binary digital signal and for producing a timer output signal in the event that no inversion occurs during a period twice as long as the maximum period of the inversion.

The foregoing and other objects and advantages of the present invention will become more clearly understood upon review of the following description taken in conjunction with the accompanying drawings.

DETAILED DESCRIPTION OF PREFERRED EMBODIMENT

The above-mentioned digital signal is, for example, comprised of a plurality of frames each of which is constituted by five hundred eighty eight (588) channel bits with a period T. Each frame contains a data signal and control signals such as a synchronizing signal, an address signal and a code correction signal. At the leading portion of each frame is positioned the synchronizing signal which is constituted by twenty two (22) channel bits and lasts for a time period of 22T from the leading point or position of each frame. In the synchronizing signal, the first channel bit is logic "1", the second through the eleventh channel bits are all logic "0", the twelfth channel bit is logic "1" and the thirteenth through the twenty-second channel bits are logic "0". The succeeding channel bit to the synchronizing signal is logic "1".

As previously mentioned, the digital signal to be recorded is modulated by a conversion process in which each eight bits of the digital signal are translated into fourteen channel bits in accordance with a predetermined conversion table (for example, a look-up table embedded in a ROM) associated with the EFM process. A unit of seventeen channel bits is then formed by adding three adjusting channel bits.

Each channel bit of the signal is recorded in the form of the NRZI, i.e., if the value of the channel bit is "1", then the signal is inverted from a logical high level (H) to logical low level (L) or from logical L level to logical H level. If the value of the channel bit is "0", the signal is not inverted.

The signal is further, processed so that more than two and less than twelve digital zeros (0) are disposed between each adjacent digital one (1). In other words, the minimum and the maximum intervals of inversion are determined to be 3T and 11T respectively (T being the duration of one channel bit).

Moreover, the signal is processed so that no successive two maximum intervals of inversion are present in any portion of the signal other than the frame synchronization portion of the signal.

Figure 1:
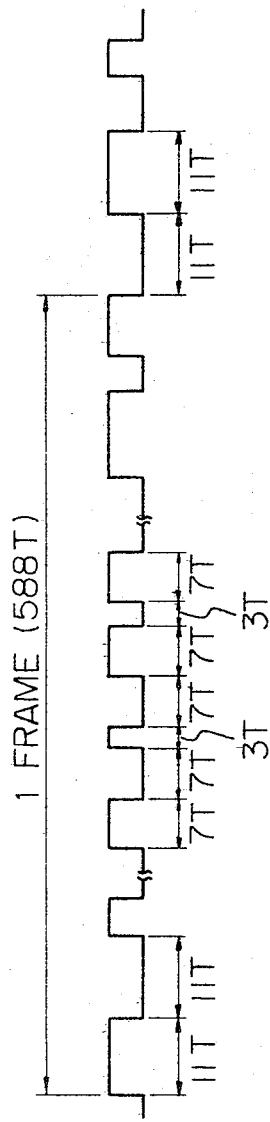
FIG. 1 is a waveform diagram illustrating the format of an exemplary binary signal train to be recorded on a digital recording medium, for example a disc.

The digital signal converted through the above-mentioned process into such a format as shown in FIG. 1 is recorded on a recording medium such as an optical recording disc.

It should be understood that the type of inversion which will occur, that is, a positive inversion from an L level to an H level or a negative inversion from an H level to an L level, at the head portion of the frame synchronizing signal depends upon the state of the signal existing just before the frame synchronizing signal.

With the above-described format, if the original signal has a fixed pattern corresponding to a 0 level, which occurs at a lead in, a lead out, or an interrupted portion of the disc, i.e., at the most inner or the most outer part of a recording track, the signal modulated by the EFM will have positive or negative inversions at intervals corresponding to sequences of 7T, 3T and 7T.

Thus, the digital signal corresponding to the fixed pattern original signal may take the form of a time series signal which includes a plurality of repeating waveforms having a period of 17T. Therefore, a signal obtained by the differentiation and full wave rectification of this digital signal includes a bright line spectrum of the clock signal as well as a spurious component having energy peaks each of which has a frequency of a multiple of one seventeenth the clock frequency.

In a player system utilizing this kind of digital recording disc. the modulated digital signal is converted to a logic pattern of ones and zeros, in accordance with the clock signal. As previously mentioned, the clock signal is generated by the steps of (a) differentiating the modulated signal, (b) full wave rectification of the differentiated signal to discriminate the bright line spectrum of the clock signal frequency, and (c) generation of the clock signal from the bright line spectrum by means of a PLL circuit. The clock signal is then compared with a reference signal of a predetermined frequency to produce a differential signal for controlling the rotation of the disc.

However, clock signal generating circuits, such as a PLL circuit, are generally inoperative when the deviation of the bright line spectrum of the input signal from the proper frequency is too large. Therefore, clock signals will not be generated if the speed of the rotation of the disc varies significantly from the proper speed. Such a deviation in the speed of rotation is particularly likely to occur during a start-up period of disc rotation of during search operation when using a constant line velocity (CLV) in which a pickup means is moved a long distance along a radial direction of the disc so as to search a predetermined address of recorded information.

Furthermore, if the bright line spectrum is accompanied by spurious components and a spurious signal is closer to the proper clock signal frequency than the bright line spectrum, it is likely that the clock signal generator circuit will tune to the spurious signal instead of the bright line spectrum.

Moreover, in the conventional systems, if the proper clock signal is not present, it is not possible to detect the frame synchronizing signal.

Figure 2:
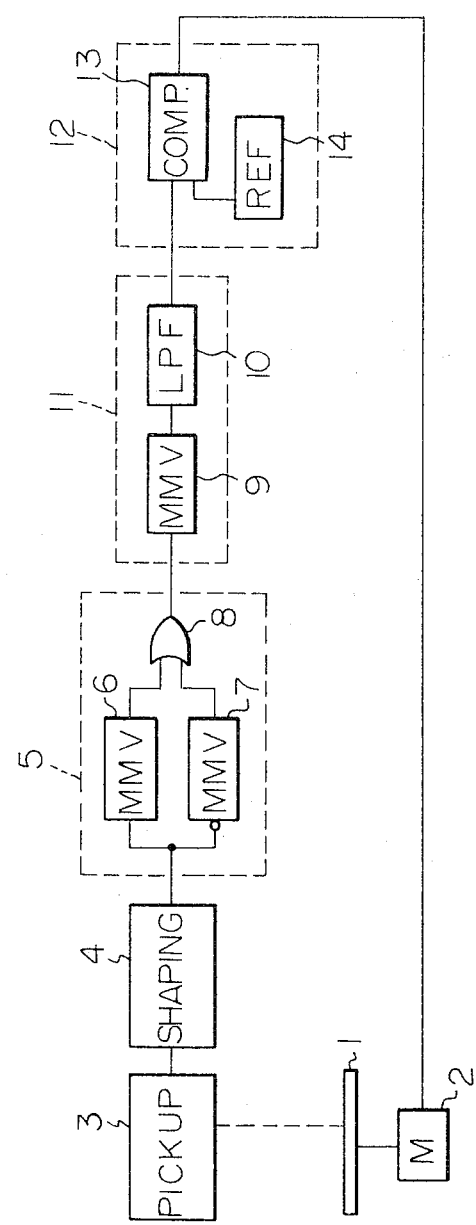
FIG. 2 is a block diagram of a preferred embodiment of the disc drive servo system in accordance with the invention.

Turning to FIG. 2, the preferred embodiment of the disc drive servo system of the present invention will be explained. As shown, the system comprises a motor 2 for driving a CLV disc 1 on which the digital signal is recorded in a manner such that the line velocity of the recording track is constant. A pickup 3 is provided to detect the digital signal on the disc in order to produce an RF (radio frequency) output signal. The RF signal produced by the pickup 3 is applied to a synchronizing signal detection circuit 5 via waveform shaping circuit 4. The synchronizing signal detection circuit 5 comprises, for example, a retriggerable monostable multivibrator (MMV) 6 which is triggered by a positive inversion (from L level to H level) of the input signal and which produces an L level outout signal for a predetermined time period $T_o$. A second retriggerable monostable multivibrator (MMV) 7 which is triggered by a negative inversion (from H level to L level) of the input signal and which produces an L level output signal for the same predetermined time period $T_o$, is further provided in the synchronizing signal detection circuit. These output L level signals of the MMV's 6 and 7 are applied to an OR gate 8. The time period $T_o$ of the MMV's 6 and 7 is selected to substantially correspond to the duration of the frame synchronizing signal 22T which is twice as long as the period of the maximum interval of inversion (more precisely, $21 > T_O \geq 22T$).

The output signal of the synchronizing signal detection circuit 5 is then applied to a frequency to voltage (F-V) converter circuit 11 which comprises a monostable multivibrator (MMV) 9 of either the retriggerable or a non-retriggerable type, and a low pass filter (LPF) 10 for integrating the output signal of the MMV 9. The MMV 9 is triggered by a positive inversion of the input signal and produces a H level output signal for a predetermined time period $T_1$. The time period $T_1$ is selected shorter than the period of the frame synchronizing signal, for example 163 s when the frequency of the frames synchronizing signal is 7.55 MHz. This output signal of the F-V converter circuit 11 is applied to a voltage comparator circuit 12 in which the input signal is compared in a comparator 13 with a predetermined reference voltage from a reference voltage source 14. The voltage comparator circuit 12 produces an output signal which is applied to the motor 2 in order to control the speed of rotation of the disc 1 so that its linear velocity of rotation remains substantially constant. If the disc 1 is of the constant angular velocity (CAV) type, its angular speed of rotation will also be maintained substantially constant.

The operation of the disc drive servo system shown in FIG. 2 will now be explained. The output signal of the waveform shaping circuit 4 which receives the RF signal from the pickup 3, is substantially a rectangular wave as shown in FIG. 1. As detailed above, for each frame of the modulated signal, the time period from a positive inversion to the next positive inversion, or the time period from a negative inversion to the next inversion is longest during the frame synchronizing portion or the signal, and the timer period $T_o$ of MMV's 6 and 7 is selected to be substantially equal to the duration 22T of the frame synchronizing signal. Therefore, if the relative speed of rotation of the disc is lower than the proper speed $V_o$, the output signal of either the MMV 6 or the MMV 7 will switch from an L level to an H level during the duration (22T) of the frame synchronizing signal. Thereupon, the MMV 9 will be triggered by the output signal of the OR gate 8.

The OR gate 8 can be omitted if the MMV 9 is of a type which substantially includes the function of an OR gate. In other words, if the MMV 9 has two input terminals and is triggered when the signal applied at one terminal thereof switches from an L level to an H level (or from an H level to an L level) while an L level (H level) signal is applied to the other input terminal thereof, then no OR gate 8 is required.

The H level output signal of the MMV 9 is integrated by the LPF 10 and then compared with a reference voltage in the comparator circuit 12. The reference voltage is equal to $V_o$ which corresponds to the output voltage of the F-V converter circuit 11 when the disc 1 is rotating at its proper speed, i.e. $v_o$. Assuming, for example, that the speed of rotation of the disc 1 is lower than the proper speed $v_o$, the comparator 13 will produce a positive output signal, to increase the speed of the motor 2.

Conversely, if the speed of rotation of the disc 1 is higher than the proper speed $v_o$, the MMV's 6 or 7 will be retriggered before the termination of the period $T_o$ by an inversion of the modulated signal. Therefore, the output signal of the detection circuit 5 remains at the L level and the MMV 9 will not produce an H level signal. The output signal level of the F-V converter 11 will therefore decrease to produce a negative signal at the comparator 13 which in turn reduces the speed of the motor 2. Thus, the speed of the motor 2 is controlled substantially at the proper speed $v_o$.

As described hereinabove, the embodiment is explained by way of an example in which the voltage level of the reference voltage source 14 is set to the value $v_o$ which corresponds to the proper speed $v_o$ of the disc and in which the frequency of the synchronizing signal is $f_o$. In this example, a decrease in the speed of rotation fo of the disc 1 cannot be detected until a time period of a converted format signal which originally lasts during a time period of 22T and is read from the disc 1 reaches a time period $T_o$ equal to 22T. This is a consequence of the fact that in the present example, the number of pulses (inversions) detected by the synchronizing signal detection circuit 5 does not increase until the above condition is satisfied. In other words, the control for increasing the speed of rotation of the disc 1 will not start until the speed of rotation slows down by at least 4.5% (1/22).

In order to improve the preciseness of the speed control, an arrangement may be adopted in which the reference voltage 14 is set at one-half of the voltage $V_o$ (where $V_o$ still corresponds to the proper speed of rotation of the disc). It should be understood that the voltage $V_o/2$ corresponds to one-half of the frequency $f_o$ of the frame synchronizing signal. In this case the probability of detecting the frame synchronizing signal by the synchronizing signal detection circuit 5 is equal to $\frac{1}{2}$. The motor 2 will be controlled at the proper speed $v_o$ by detecting an average one of two frame synchronizing signals. Therefore, if the speed of rotation of the disc 1 slightly decreases and becomes lower than the proper speed $v_o$, the probability of detecting the frame synchronizing signal by the synchronizing signal detection circuit 5 will have a value much greater than $\frac{1}{2}$. Thus, the present arrangement eliminates a range of speed that is 4.5% of decrease of speed in which the control of the speed of rotation of the disc is not possible. On the other hand, if the speed of rotation of the disc 1 increases and becomes slightly higher than the proper speed $v_o$, the probability of the detection circuit 5 detecting the frame synchronizing signal will have a value much smaller than $\frac{1}{2}$.

Figure 3:
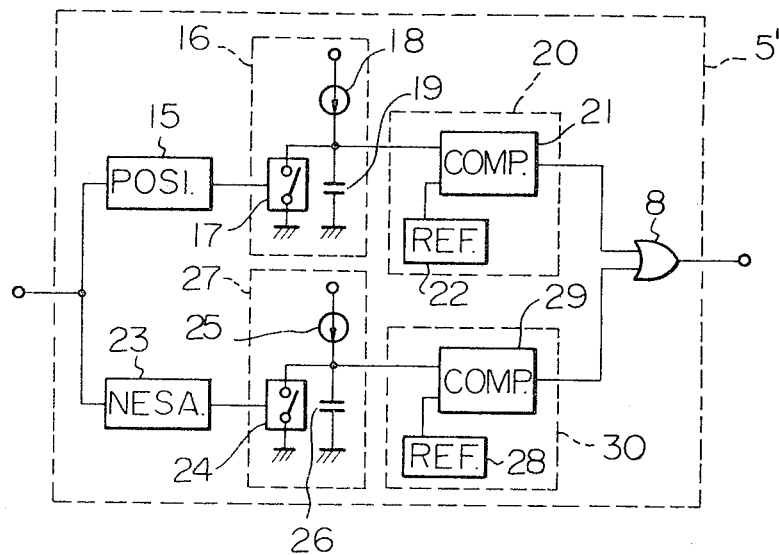
FIG. 3 is a block diagram of an alternate embodiment of the synchronizing signal detector of FIG. 2.

Turning to FIG. 3, another example 5' of synchronizing signal detection circuit 5 of FIG. 2 will be explained. The circuit comprises a positive inversion detection circuit 15, which, upon detection of a positive inversion of the input signal, momentary closes a normally open switch 17 of a charge and discharge circuit 16. Thus, the charging of a capacitor 19 by a constant current source 18 may be replaced by a constant voltage source and a series resistor connected thereto. The voltage at a terminal between the capacitor 19 and the constant current source 18 is applied to a comparator 21 of a comparator circuit 20 in which the input voltage is compared with a reference voltage from a reference voltage source 22. Thus, the charge and discharge circuit 16 and the comparator circuit 20 form a timer circuit corresponding to the MMV 6 in the previous example. This timer circuit produces an output signal at an input terminal of an OR gate 8 when the charge voltage of the capacitor 19 exceeds the reference voltage 22.

The synchronizing signal detection circuit 5' also comprises a negative inversion detection circuit 23 whose output signal is connected to a charge and discharge circuit 27 (including a normally open switch 24, a constant current source 25, and a capacitor 26), and a comparactor circuit 30 which includes a comparator 29 and a reference voltage source 28. The negative inversion detection circuit 23 produces an output signal to momentarily close the normally open switch 24 upon detection of negative inversion. The charge and discharge circuit 27 and the comparator circuit 30 operate in the same manner as the corresponding charge and discharge circuit 16 and the comparator circuit 20 described hereinabove.

The operation of the synchronizing signal detection circuit 5' will now be explained. When the positive inversion is detected by the positive inversion detection circuit 15, the switch 17 is momentarily closed to discharge the electric charge stored in the capacitor 19. Immediately after the opening of the switch 17, the charging current flows into capacitor 19. The voltage of the reference voltage source 22 is compared to the level of the voltage which develops at the terminal between the capacitor 19 and the current source 18 after a charging time of $T_o$ has elapsed. Therefore, if the interval of the positive inversion is shorter than the time period $T_o$, the charge voltage of the capacitor 19 does not exceed the reference voltage level. Thus the output signal of the comparator 21 is maintained at L level. On the other hand, if the interval of the positive inversion is longer than the time period $T_o$, the voltage across the capacitor 19 will exceed the reference voltage, and consequently, the output signal of the comparator 21 switches from an L level to an H level. Similarly, if the interval of the negative inversion is shorter than the time period $T_o$, the output signal of the comparator 29 is maintained low. If the interval of the negative inversion is longer than the timer period $T_o$, the output signal of the comparator 29 switches from an L level to an H level.

Figure 4:
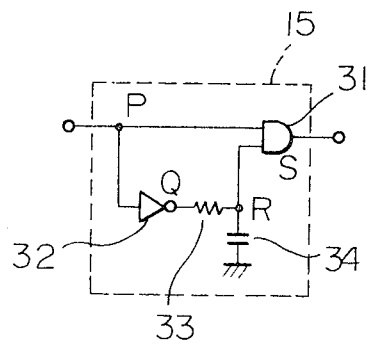
FIG. 4 is a circuit diagram of the positive inversion detection circuit of FIG. 3.

Reference is now made to FIG. 4, which shown an example of the positive inversion detection circuit 15 of FIG. 3. As shown, the circuit comprises an AND gate 31 having a first input terminal to which the input signal from terminal P is directly connected and a second input terminal connected to an integration circuit including an invertor 32, a resistor 33, and a capacitor 34.

Figure 5:
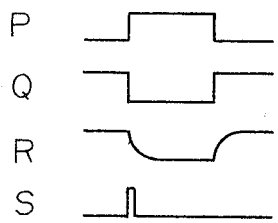
FIG. 5 is a waveform diagram illustrating an exemplary output signal of the positive inversion detection circuit shown in FIG. 4.

The operation of the positive inversion detection circuit 15 shown in FIG. 4 will be explained with reference to FIG. 5. The waveforms illustrated in FIG. 5 correspond to the voltages appearing at similarly indicated terminals in FIG. 4. When a positive inversion signal is applied to terminal P, a negative inversion signal is generated at an output terminal Q of the inverter 32. The negative inversion signal at the terminal Q is then transmitted through resistor 33 to function R in accordance with an RC time constant determined by the integration circuit consisting of resistor 33 and capacitor 34. Therefore the AND gate 31 will receive H level signals at its first and second input terminals at the initial moment of the application of a positive inversion signal. Therefore, the AND gate 31 produces a pulse signal at output terminal S. If a negative inversion signal is applied to this positive inversion detection circuit, the AND gate 31 will not produce a pulse signal since L level signals will be applied to at least one of its input terminals.

Figure 6:
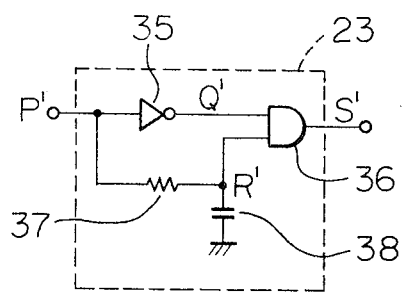
FIG. 6 is a circuit diagram of the negative inversion detection circuit of FIG. 3.
Figure 7:
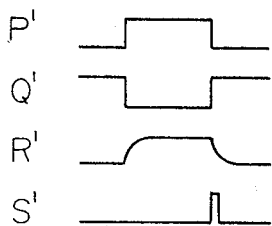
FIG. 7 is a waveform diagram illustrating an exemplary output signal of the detection circuit of FIG. 6.

FIG. 6 shows an example of the negative inversion detection circuit 23 of FIG. 3 and its operation will be explained with reference to FIG. 7. The waveforms illustrated in FIG. 7 correspond to the voltages appearing at similarly indicated terminals in FIG. 6. The circuit comprises an AND gate 36 having a first input terminal to which the input signal is applied via an invertor 35 and a second input terminal to which the input signal is applied via an integrating circuit including a resistor 37 and a capacitor 38. When a negative inversion signal is applied to a junction P' between an input terminal of the invertor 35 and the resistor 37, a positive inversion signal is generated at an output terminal Q' of the invertor 35. The negative inversion signal from P' is also transmitted through resistor 37 to a junction R' in accordance with an RC time constant determined by the integration circuit comprising resistor 37 and capacitor 38. Thus, the AND gate 36 will receive a H level signal at its first and second input terminals at the initial moment of application of a negative inversion signal, and will thereupon produce a pulse signal at its output terminal S'. If a positive inversion signal is applied to this circuit, the AND gate 36 does not produce a pulse signal since L level signals will be applied to at least one of the input terminals.

It will be appreciated from the foregoing that in accordance with the preferred embodiment of the invention, a synchronizing signal is detected by using a timer circuit which is triggered each time that either a positive or negative inversion of the input signal is present. After triggering, a timer circuit starts its timing operation and produces an output signal if the next triggering signal does not arrive within a time period which is twice as long as the maximum interval of inversion. An output control signal is produced in this way and the speed of rotation of the disc is controlled in accordance with the output signal of the timer circuit. Thus, precise control of the speed of rotation of the disc is possible even if no clock signal is picked up from the digital signal on the disc. Furthermore, the speed control signal may be produced more precisely by setting the reference value of an output comparator circuit at one-half of the proper value of the frequency ($f_o$) of synchronizing signal.

A preferred embodiment of the present invention has been described hereinabove. It should be understood, however, that the foregoing description is for illustrative purpose only, and is not intended to limit the scope of the invention. Rather, there are numerous equivalents to the preferred embodiment, and such are intended to be covered by the appended claims.

What is claimed is:

1. A disc drive servo system for controlling the drive of a disc carrying a binary digital signal, said digital signal including (i) information signal portions in which a position of an inversion of said digital signal is determined in accordance with an analog information signal and (ii) synchronizing signal portions having successive maximum periods of said inversion, comprising:

a pick up means for detecting the digital signal on said disc;

a timer means responsive to an output signal of the pick up means, said timer means being operable to initiate a timing operation from an initial state upon receipt of one of a positive and negative inversion of said digital signal and to produce an output signal when no further inversion occurs during a time period of at least twice as long as the maximum period of the inversion;

a frequency-to-voltage converter responsive to the output signal of said timer means for generating an output voltage level;

means for generating a reference voltage level;

a comparator, responsive to said output voltage level and said reference voltage level for generating a disc drive control signal; and a disc drive means for driving the disc in accordance with said disc drive control signal.

2. The disc drive servo system of claim 1, wherein said synchronizing signal portions have an associated frequency and said reference voltage level corresponds to a frequency which is substantially one-half the frequency of said synchronizing signal portions.

3. The disc drive servo system of claim 1 wherein said frequency-to-voltage converter comprises a monostable multivibrator responsive to the output signal of said timer means for producing an output signal of a predetermined duration upon receipt of said timer means output signal and a low filter connected to said monostable multivibrator for integrating an output signal of said monostable multivibrator.

4. The disc drive servo system of claim 1, wherein said timer means comprises a first means responsive to the output signal of said pick up means for producing a first output signal in response to the positive inversion, a second means responsive to the output signal of said pick up means for producing a second output signal in response to the negative inversion, and an OR gate for producing a logic signal in accordance with said first and second output signals.

5. The disc drive servo system of claim 4, wherein said first and second means comprise retriggerable monostable multivibrators.

6. The disc drive servo system of claim 4, wherein said first and second means each comprise a capacitor connected to a current source, a switch for controlling the charging of said capacitor by said current source, and a comparator for comparing a voltage level across said capacitor with a predetermined reference voltage level.

7. The disc drive servo system of claim 6, wherein said first means further includes a positive inversion detection circuit comprising:
 (a) a first invertor having an input and an output;
 (b) a first integrator connected to the output of said invertor and having an output,
 (c) a logic AND gate having first and second input terminals connected to the input of said first invertor and the output of said first integrator, respectively.

8. The disc drive servo system of claim 7, wherein said second means further includes a negative inversion detection circuit, comprising;
 (a) a second invertor having an input and an output;
 (b) a second integrator connected to the input of said invertor and having an output,
 (c) a logical AND gate having first and second input terminals connected to the output of said second invertor and the output of said second integrator, respectively.

9. A synchronizing signal detector for detecting a synchronizing signal from a binary digital signal, said digital signal including (i) information signal protions in which a position of an inversion of said digital signal is determined in accordance with an analog information signal and (ii) synchronizing signal portions which include two successive maximum periods of the inversion, comprising:
 a timer means responsive to the digital signal for producing a timer output signal, said timer means being operable to initiate a timing operation from an initial state upon receipt of either a positive or negative inversion of said digital signal and to produce a timer output signal when no positive or negative inversion occurs during a period substantially twice as long as the maximum period of the inversion.

10. The synchronizing signal detector of claim 9, wherein said timer means comprises a first means for producing a first output signal in response to the positive inversion, a second means for producing a second output signal in response to the negative inversion, and an OR gate for producing a logic OR signal in accordance with said first and second output signals.

11. The synchronizing signal detector of claim 10, wherein said first and second means each comprise retriggerable monostable multivibrators.

12. The synchronizing signal detector of claim 10, wherein said first and second means each comprise a capacitor connected to a current source, a switch for controlling the charging of said capacitor by said current source, and a comparator for comparing a voltage level across said capacitor with a predetermined reference voltage signal.

13. The synchronizing signal detector of claim 12, wherein said first means further includes a positive inversion detection circuit, comprising:
 (a) a first invertor having an input and an output;
 (b) a first integrator connected to the output of said first inverter and having an output; and
 (c) a first logic AND gate having first and second input terminals connected to the input of said first invertor and the output of said first integrator, respectively.

14. The synchronizing signal detector of claim 12, wherein said second means further includes a negative inversion detection circuit, comprising:
 (a) a second invertor having an input and an output;
 (b) a second integrator connected to the input of said invertor and having an output;
 (c) a second logical AND gate having first and second input terminals connected to the output of said second invertor and the output of said second integrator, respectively.

* * * * *